July 28, 1931. E. GRASSOT 1,816,771
SELECTIVE RELAY RESPONSIVE TO UNBALANCE ON ELECTRIC SYSTEMS
Filed Nov. 14, 1927
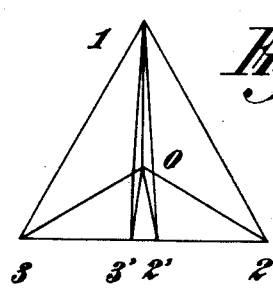
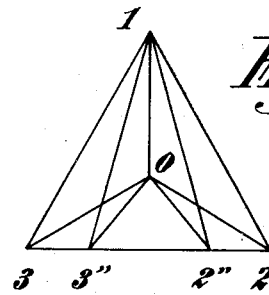
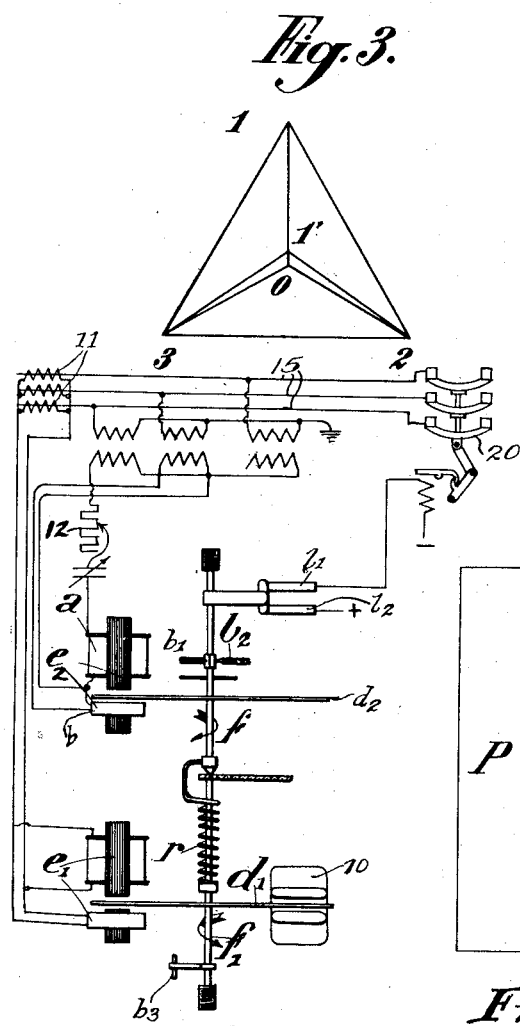
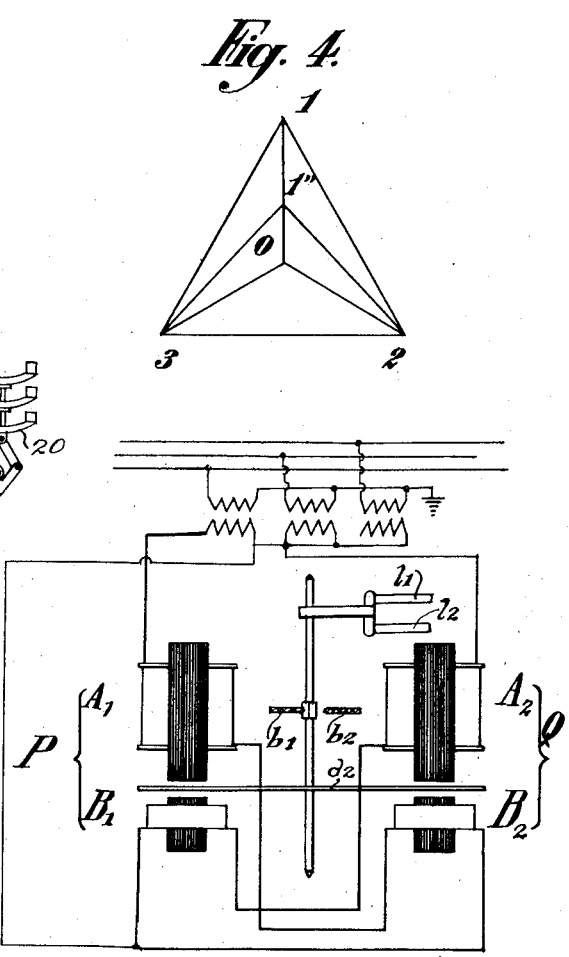
Inventor
Emile Grassot
by Wilkinson + Giusta
Attorneys.

Patented July 28, 1931

1,816,771

UNITED STATES PATENT OFFICE

EMILE GRASSOT, OF PARIS, FRANCE, ASSIGNOR, BY MESNE ASSIGNMENTS, TO GENERAL ELECTRIC COMPANY, A CORPORATION OF NEW YORK

SELECTIVE RELAY RESPONSIVE TO UNBALANCE ON ELECTRIC SYSTEMS

Application filed November 14, 1927, Serial No. 233,275, and in France January 29, 1927.

The present invention relates to a relay device for protecting a polyphase supply system.

In selective relays termed impedance relays, distance relays or voltage drop relays one strives to obtain a retardation in relay release which shall be proportional to the voltage between the phases or between one phase and earth of the electric circuit to be protected.

On a fault occuring in a supply line, at least one of the aforesaid voltages vanishes or becomes a minimum at the fault. Hence the relays placed nearest the fault are released first and ensure that the faulty sector is thrown out of circuit.

In my co-pending U. S. patent application Serial No. 129,031 filed August 13, 1926, I have disclosed a relay fulfilling the above requirements. In this relay a movable equipment is subjected to an electro-magnet tending to make it rotate at a speed proportional to a function of one or more of the electrical characteristics of the circuit to be protected. This movement or rotation may be permitted only on the occurrence of a fault. The movable equipment through its rotation winds a spring which is fixed to it at one end and which has its other end secured to a counter acting equipment, similar to an induction meter. This is acted on by an electro-magnet so as to produce a torque opposing that of the spring and proportional to the continued product of the r. m. s. values of two of the voltages between two phases and the sine of the phase angle between them. If a contact finger is carried by the counter acting equipment for actuating the line circuit breaker, and if matters are arranged so that the circuit breaker shall be tripped when the opposing torques, to which the counteracting equipment is subjected become unbalanced, then it will be readily understood that if the torque produced by the spring is proportional to its angle of twist, the circuit-breaker will be tripped after an interval of time proportional to the quotient of the torque acting on the counter acting equipment by the speed, supposed constant, of the movable equipment.

Now, on an absolute short-circuit occurring between phases, one of the voltages between two phases becomes zero and the other two become equal and in phase. Consequently the product of two of the line voltages by the phase angle between them will become zero, either because one of the line voltages employed has vanished, or because the phase angle has become zero. Hence one of the opposing torques is zero at the short-circuit and the relay release is instantaneous.

As one proceeds along the line away from the fault, the voltage between the faulty phases increases in proportion to the distance from the fault and consequently the relay release retardation is proportional to the distance from the fault. This can be perceived from a brief study of Figs. 1 and 2 of the accompanying drawings in which:

Fig. 1 is a vector diagram of voltages in the immediate vicinity of a fault between phases.

Fig. 2 is a vector diagram of voltages at a greater distance from a fault between phases.

Figs. 3 and 4 are respectively voltage vector diagrams for faults between a phase and earth in the immediate vicinity of and at a greater distance from the fault.

Fig. 5 illustrates a type of relay used in connection with the present invention.

Fig. 6 illustrates the relay of Fig. 5 modified in accordance with the invention.

In Fig. 1, 1—2—3 and 1—2'—3', are respectively the voltage triangles in the vicinity of the fault before and after occurrence of this fault between the phases 2 and 3, whilst in Fig. 2, 1—2''—3'' is the voltage triangle at a greater distance from the fault between the phases 2 and 3.

It will moreover be readily understood that the torque in question on the counter acting equipment is proportional to the area of the voltage triangle since the area of a triangle is proportional to the product of any two of its sides by the sine of the included angle. Furthermore no particular side need be preferred to another, so that the relay can be mounted across any two phases and will act irrespective of whether the fault occurs between phases 1 and 2, 2 and 3 or 3 and 1.

On the other hand when a short circuit occurs between one phase and earth as shown in Figs. 3 and 4 the torque does not vanish, for the area of the voltage triangle does not vanish, and consequently instantaneous release of the relay will not be obtained at the fault itself.

This drawback has been obviated by subjecting the counteracting electro-magnet to a second electro-magnet influenced by the zero phase sequence component of the voltages between the phases and earth. When the voltage system is in equilibrium this second electro-magnet is not excited, as the zero phase sequence component of the voltages between the phases and earth is then nil. When a fault occurs between a phase and earth the system becomes unbalanced the star voltages have a geometrical resultant and the electro-magnet, influenced by said resultant, acts on the counteracting equipment of the relay in opposition to the torque produced by the two line voltages. The second electro-magnet is regulated so that, when a complete short-circuit between phase and earth occurs, the torque produced by it on the counteracting equipment shall exactly balance that produced by the line voltages so that, the resultant opposing torque acting on the counteracting equipment being nil, the release of the relay will be instantaneous. Here again, as the distance from the fault increases, the retardation in relay release will increase, for the torque produced on the counteracting equipment by the second electro-magnet will decrease whilst that produced by the first electro-magnet will increase.

Such a device, however, calls for very careful balancing of the torque exerted by the two electro-magnets on the counteracting equipment, for a slight error in one of these torques produces a large error in their resultant, that is to say, in the relay release retardation.

The object of the present invention is to dispense with the necessity for such balancing, the counteracting equipment of the relay being only subjected to the action of one electro-magnet. To this end, two windings of an electro-magnet similar to an induction meter are acted on either by two of the voltages between a phase and earth, or by one of the line voltages and one of the voltages between phase and earth. The torque exerted on the counteracting equipment is hence proportional to the area of the triangle formed by two of the voltages between a phase and earth and the voltage between these phases, that is to say for example the triangle 0—1—2 Fig. 3. This triangle becomes nil in the case of a short circuit between phase 1 and the earth, or between phase 2 and the earth.

If a short-circuit occur between phase 3 and the earth, the triangle 0—1—2 does not vanish. However, for complete protection, it is only necessary to use a second relay producing a torque proportional to the area of the triangle 0—1—3 or 0—2—3. In this manner, on a short-circuit occurring between a phase and the earth, one or other of the relays, or, in one case, the two simultaneously, will operate, according to whichever phase is earthed.

The release will be instantaneous if the relays are located at the fault itself and all the more retarded as the distance between the relays and the fault lengthens. Incidentally it should be noted that the device according to the present invention is likewise applicable to the case of shortening between phases, as in this case likewise the areas of the triangles 0—1—2, 0—2—3, 0—3—1 will become nil according to which pair of phases are shortened.

Fig. 5 represents a form of relay which can be used in accordance with the invention. The mode of operation of this relay will be readily understood from what precedes and the following description.

$d_1$ is a movable element, such as a disc of electric current conducting material, constituting the movable equipment upon which an electro-magnet $e_1$ is made to exert a driving torque in the direction indicated by the arrow $f_1$. This torque will become effective on the occurrence of a fault and, in general, will be chosen to correspond to the particular protection desired although it may be independent of the electrical characteristics of the circuit to be protected. For ground fault protection, the torque may be a function of the zero phase current as shown, the cooperation windings of the electro-magnet $e_1$ being connected in the residual circuit of a plurality of current transformers whose secondaries 11 are connected in parallel. Between the disc $d_1$ and a second movable member, such as a disc $d_2$, of electric current conducting material constituting the counteracting equipment, is located a spring $r$ the ends of which are respectively secured to the coaxial spindles of the two discs in such wise that the disc $d_1$ by coiling the spring will cause it to exert a torque on the disc $d_2$ proportional to the angle through which the disc $d_1$ has rotated and, consequently, the spring $r$ has been twisted. The disc $d_2$ is subjected to an electro-magnet $e_2$ having two windings $a$ and $b$ respectively energized by a voltage between a phase and earth and another voltage of the circuit which may be one of the interphase voltages or another of the voltages between a phase and earth, as shown in such manner that the currents in these windings, or rather the fluxes they create have between them the same phase angle as the corresponding voltages. Consequently the torque exerted on the disc $d_2$, in the direction indicated by the arrow $f$, will be dependent on the product of the voltages and a function of phase angle between them.

Normally the torque of the electro-magnet $e_2$ maintains the spindles of the discs $d_1$ and $d_2$ against stops $b_1$, $b_3$ respectively, since the electro-magnet $e_1$ is inactive until the occurrence of a fault. When a fault occurs, for example a fault to ground on a conductor of the circuit 15, the electro-magnet $e_1$ becomes energized and proceeds to effect the winding of the spring $r$. The torsion to which this spring is subjected will increase with the time necessary to predominate or overcome the torque exerted by the electro-magnet $e_2$ on the disc $d_2$. This time is in turn dependent on how severely the voltages on the windings $a$ and $b$ at the relay location are affected; the magnitude of the torque exerted by the electro-magnet $e_1$ and whether the disc $d_1$ is retarded by any means such as a drag magnet 10. When the torsion of the spring $r$ is sufficient to overcome the torque of the electro-magnet $e_2$ on its disc $d_2$, the spindle thereof is moved from a position determined by the stop $b_1$ to a position determined by the stop $b_2$ to effect circuit controlling action of the contacts $l_1$ and $l_2$ and thereby the tripping of the circuit breaker 20.

In order to render the phase angle of the fluxes in the two windings of the electro-magnet equal to the phase displacement of the voltages impressed across said windings, the resistances and the reactances of the circuits in which said windings are located shall be made equal. This may be accomplished by the use of suitable impedance means 12 as shown, for the torque may thus be made substantially proportional to the product of the voltages and the sine of the phase angle between them.

Fig. 6 shows another means for accomplishing this impedance balance and, if desired, for obtaining a more powerful torque whilst at the same time diminishing the amount of adjustment required for the relay.

According to my invention, two substantially identical motor elements, such as electro-magnets P, Q are employed. If $A_1$ and $A_2$ are one set of identical windings and $B_1$ and $B_2$ the other set of identical windings then $A_1$ and $B_2$ are connected in series as also are $A_2$ and $B_1$. In this manner, two practically identical circuits are obtained and also double the torque produced by one electro-magnet. Supplemental adjustment of the relays is thus reduced to a minimum.

I claim:

1. Means for protecting a three-phase electric circuit against faults including, in combination, a rotatable element, an electro-magnet having two windings respectively connected to be energized in accordance with two of the voltages between phases and earth for exerting on said rotatable element a torque proportional to the continued product of said voltages and the sine of the phase angle between them, means for subjecting said element to an opposing torque increasing proportionately to the time lapse after the occurrence of a fault, and means arranged to be controlled by said element for interrupting said circuit when said opposing torque predominates.

2. Means for protecting a three-phase electric circuit against faults, including, in combination, a rotatable element, an electro-magnet, having a winding connected to be energized in accordance with the voltage between one of the phases and earth and a cooperating winding connected to be energized in accordance with another voltage of the circuit for exerting on said rotatable element a torque proportional to the continued product of said voltages and the sine of the phase angle between them, means for subjecting said element to an opposing torque increasing proportionately to the time lapse after the occurrence of a fault, and means arranged to be controlled by said element for interrupting said circuit when said opposing torque predominates.

3. Means for protecting a three-phase electric circuit against faults, including in combination a rotatable element, two electro-magnets each having two windings of non-identical impedance, the respective impedances of the windings of one electro-magnet being substantially the same as the impedances of the windings of the other electro-magnet and each winding of one electro-magnet being connected in series with the non-identical impedance winding of the other electro-magnet and the pairs of thus connected windings being respectively connected to be energized in accordance with two of the voltages between phases and earth whereby said electro-magnet exert on said rotatable element a torque proportional to twice the continued product of said voltages and the sine of the phase angle between them, means for subjecting said element to an opposing torque increasing proportionately to the time lapse after the occurrence of a fault, and means arranged to be controlled by said element for interrupting said circuit when said opposing torque predominates.

4. Means for protecting a three-phase electric circuit against faults, including in combination a rotatable element, two electric-magnets each having two windings of non-identical impedance, the respective impedances of the windings of one electro-magnet being substantially the same as the impedances of the windings of the other electro-magnet and each winding of one electro-magnet being connected in series with the non-identical impedance winding of the other electro-magnet and the pairs of thus connected windings being respectively connected to be energized in accordance with a voltage between phase and earth and another voltage of the circuit whereby said electro-magnets exert on said rotatable element a torque proportional to twice the continued product of said voltages and the sine of the phase angle between them, means for subjecting said element to an opposing torque increasing proportionately to the time lapse after the occurrence of a fault, and means arranged to be controlled by said element for interrupting said circuit when said opposing torque predominates.

5. Protective means for a polyphase electric circuit including a movable element, means for exerting on said element an effect proportional to the product of the voltage to ground of a conductor of the circuit, another voltage of the circuit and a function of the phase displacement of said voltages including an electro-magnet having a winding connected to be energized in accordance with the voltage to ground of a conductor of the circuit and a cooperating winding connected to be energized in accordance with another voltage of the circuit, and means for subjecting said element to an opposing effect increasing proportionately the time lapse after the occurrence of a fault.

6. Means for protecting a three-phase electric circuit against faults including a circuit interrupter, a movable element, means for exerting on said element an effect dependent on the product of the voltage to ground of a conductor of the circuit, another voltage of the circuit and the sine of the phase angle between said voltages including an electro-magnet having a winding connected to be energized in accordance with the voltage to ground of a conductor of the circuit and a cooperating winding connected to be energized in accordance with another voltage of the circuit, and means cooperating with said element to effect the opening of said interrupter after the occurrence of a fault in a time dependent on the effect exerted on said element.

7. Means for protecting a three-phase electric circuit against faults including a circuit interrupter, a rotatable element, an electro-magnet having two windings respectively connected to be energized by two of the voltages between phases and earth for exerting on said element a torque proportional to the product of said voltages and the sine of the phase angle between them and means cooperating with said element to effect the opening of the circuit interrupter after the occurrence of a fault in a time dependent on the torque exerted on said element.

8. A relay including a movable electric current conducting element, two electro-magnets inductively associated with said element, each electro-magnet including two cooperating windings arranged on energization to induce currents in the element whereby to tend to actuate the same, each winding of each electro-magnet being connected in circuit with one winding of the other electro-magnet and the construction and arrangement of parts being such that when the pairs of thus connected windings are respectively energized by two different electromotive forces the phase displacement of the fluxes due to the windings of each electro-magnet is substantially the same as the phase displacement of the electromotive forces.

9. A relay including a movable electric current conducting element, two substantially identical electro-magnets inductively associated with said element, each electro-magnet comprising two cooperating windings arranged on energization to induce currents in the element whereby to tend to actuate the same, each winding of each electro-magnet being connected in series with one winding of the other electro-magnet and the construction and arrangement of parts being such that when the pairs of thus connected windings are respectively energized by two different electromotive forces, the phase displacement of the fluxes due to the windings of each electro-magnet is substantially the same as the phase displacement of the electromotive forces.

10. An induction type relay including a rotatably mounted disc, two substantially identical motor elements for rotating said disc, each element including two cooperating windings arranged on opposite sides of the disc, each winding of each motor element being connected in series with the winding of the other motor element on the opposite side of the disc, the construction and arrangement of parts being such that when the currents of thus connected windings are energized from two different electromotive forces the torque exerted by each of said motor elements is proportional to the product of the electromotive forces and the sine of the phase angle between them.

11. Fault responsive relay means for a polyphase electric circuit including relatively movable cooperating contacts, a movable element, means for exerting on said element an effect dependent on the product of a voltage to ground of a conductor of the circuit, another voltage of the circuit and a function of the phase displacement of said voltages including an electro-magnet having a winding connected to be energized in accordance with the voltage to ground of a conductor of the circuit and a cooperating winding connected to be energized in accordance with another voltage of the circuit, and means cooperating with said elements to effect circuit controlling action of said contacts on the occurrence of a fault in a time dependent on the effect exerted on said element.

12. Fault responsive relay means for a three-phase electric circuit including relatively movable cooperating contacts, a rotatable element, means for exerting on said element an effect dependent on the product of a voltage to ground of a conductor of the circuit, another voltage of the circuit and the sine of the phase angle between said voltages including an electro-magnet having a winding connected to be energized in accordance with the voltage to ground of a conductor of the circuit and a cooperating winding connected to be energized in accordance with another voltage of the circuit, and means cooperating with said element to effect circuit controlling operation of said contacts on the occurrence of a fault in a time dependent on the torque exerted on said element.

13. Fault responsive induction relay means for a three-phase electric circuit, including relatively movable cooperating contacts, a disc, means for exerting on said disc a torque substantially proportional to the product of the voltages to ground of two conductors of the circuit and the sine of the phase angle between said voltages including electro-magnetic means inductively associated with the disc and including two cooperating windings respectively connected to be energized in accordance with the voltages to ground of two conductors of the circuit, and means cooperating with said element to effect circuit closing action of said contacts on the occurrence of a fault in a time dependent on the torque exerted on said disc.

EMILE GRASSOT.